(12) United States Patent
Ramalingam et al.

(10) Patent No.: US 6,778,727 B2
(45) Date of Patent: Aug. 17, 2004

(54) OPTIC SWITCH

(75) Inventors: Suresh Ramalingam, Fremont, CA (US); Venkatesan Murali, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/714,414

(22) Filed: Nov. 14, 2003

(65) Prior Publication Data

US 2004/0096144 A1 May 20, 2004

Related U.S. Application Data

(63) Continuation of application No. 09/752,901, filed on Dec. 29, 2000, now Pat. No. 6,687,427.

(51) Int. Cl.$^7$ .............................. G02B 6/26; G02B 6/42
(52) U.S. Cl. ......................................................... 385/16
(58) Field of Search ................................ 385/8, 12–14, 385/39, 129–132, 16, 40–42, 142, 126

(56) References Cited

U.S. PATENT DOCUMENTS

| | | |
|---|---|---|
| 4,753,505 A | 6/1988 | Mikami et al. |
| 4,874,222 A | 10/1989 | Vacha et al. |
| 4,989,962 A | 2/1991 | Kebo |
| 5,294,240 A | 3/1994 | Sanghera et al. |
| 5,800,860 A | 9/1998 | Kilian et al. |
| 6,026,209 A | 2/2000 | Rhee et al. |
| 6,246,809 B1 | 6/2001 | Jouanno et al. |
| 6,321,009 B1 | 11/2001 | Klein Koerkamp |
| 6,393,167 B1 | 5/2002 | Davis et al. |

*Primary Examiner*—Javaid H. Nasri
(74) *Attorney, Agent, or Firm*—Blakely, Sokoloff, Taylor & Zafman LLP

(57) ABSTRACT

An apparatus comprising a body having dimensions suitable for light transmission therethrough, the body comprising a core extending therethrough, a first portion of the core comprising an index of refraction different than a second portion of the core and a cladding disposed about the core. An optical electronic integrated circuit (OEIC) substrate comprising a plurality of waveguides and a light source emitter coupled to at least one of the plurality of waveguides. A method comprising providing optical signals to an optical electronic integrated circuit (OEIC) through a plurality of waveguides are arranged in a circuit of different paths; and selecting an optical path by the index of refraction of a portion of the core.

11 Claims, 3 Drawing Sheets

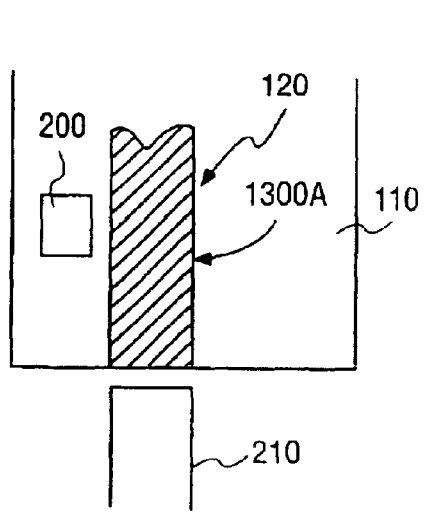
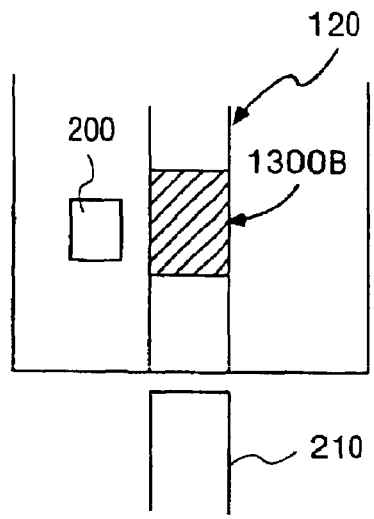
FIG. 2   FIG. 3
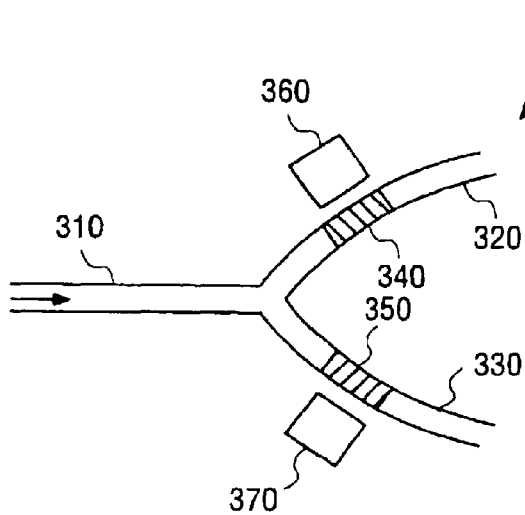
FIG. 4
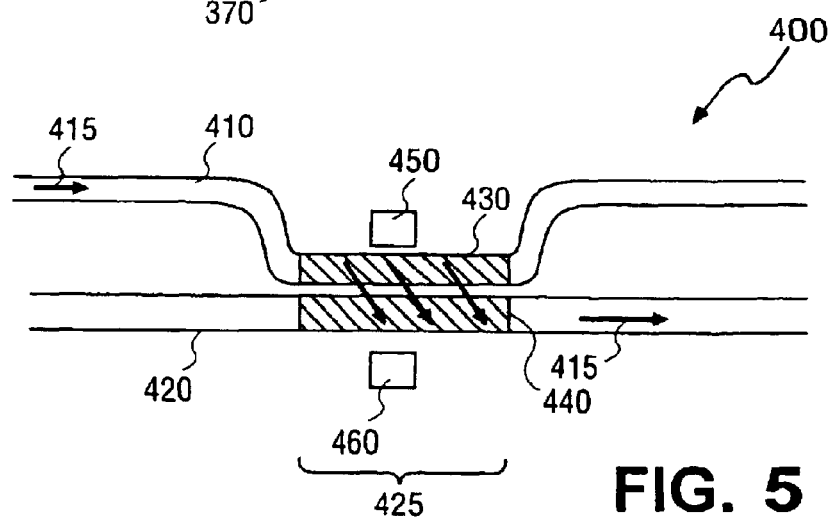
FIG. 5

OPTIC SWITCH

CROSS-REFERENCE TO RELATED APPLICATION

This application is a Continuation of U.S. patent application Ser. No. 09/752,901, filed Dec. 29, 2000, now U.S. Pat No. 6,687,427.

FIELD OF THE INVENTION

The invention relates to optical signaling and waveguides utilized in such signaling.

BACKGROUND

Optical circuits offer advantages over traditional electrical circuits, particularly in the perceived ability to provide higher speed data transmissions. Such transmissions may take place not only between computers, but also within machines, in which case board-to-board and chip-to-chip data communication using optical circuits can be utilized.

In a conversion area of a light signal and an electrical signal, a light transmission path including an optical fiber or an optical waveguide, or a photoelectron conversion element (e.g., laser diode, photodiode, etc.) may be used. A circuit for optical information processing, e.g., an optical electronic integrated circuit (OEIC), typically may include a combination of a light transmission path or photoelectron conversion element(s), and a circuit (e.g., an integrated circuit for controlling an electronic element, processing an electronic signal, and/or a circuit for driving an electronic part).

An optical waveguide may be used, in one example, to couple an optical signal with an OEIC. In an optical waveguide, control of an index of refraction is necessary for a single mode light transmission. The typical optical waveguide includes a core portion and a cladding portion disposed above the core portion. The index of refraction of the cladding portion is generally slightly lower than the index of refraction of the core portion. For example, a typical specification for a silicon dioxide ($SiO_2$) based single mode waveguide core and cladding portion includes a core size on the order of 6 to 8 microns by 6 to 8 microns, with a difference between an index of refraction of the core portion and that of the cladding portion on the order of about 0.25 percent.

As noted above, an important property of a waveguide lies in the difference in the index of refraction of the core and the cladding. In general, the difference in the index of refraction between the core portion and the cladding portion determines the amount of reflection of a light transmission through the waveguide. In the single mode waveguide, one objective is for total internal reflection within the waveguide. Silicon dioxide based waveguides (i.e., where the core and cladding portions are both silicon dioxide) are limited in their index of refraction difference between the core portion and the cladding, such limit generally determined by the amount of dopants added to the cladding portion.

What is needed is an improved waveguide.

BRIEF DESCRIPTION OF THE DRAWINGS

FIG. 2 shows a schematic top plan view of a first embodiment of the structure of FIG. 1 having a waveguide coupled to an optical fiber.

FIG. 3 shows a schematic top plan view of a second embodiment of the structure of FIG. 1 having a waveguide coupled to an optical fiber.

FIG. 4 schematically illustrates a top plan view of an optical signal path according to an embodiment of the invention.

FIG. 5 schematically illustrates a top plan view of a second embodiment of optical signal paths in accordance with an embodiment of the invention.

DETAILED DESCRIPTION

An apparatus is disclosed as is a method of routing an optical signal. In one embodiment, the apparatus is a waveguide comprising a body having a dimension suitable for light transmission therethrough. The body of the waveguide includes a core comprising a first portion including material having an index of refraction different than a second portion of the core and a cladding disposed about the core. A method of routing an optical signal includes selecting an optical path by modifying the index of refraction of the core portion of the waveguide.

Figure 1:
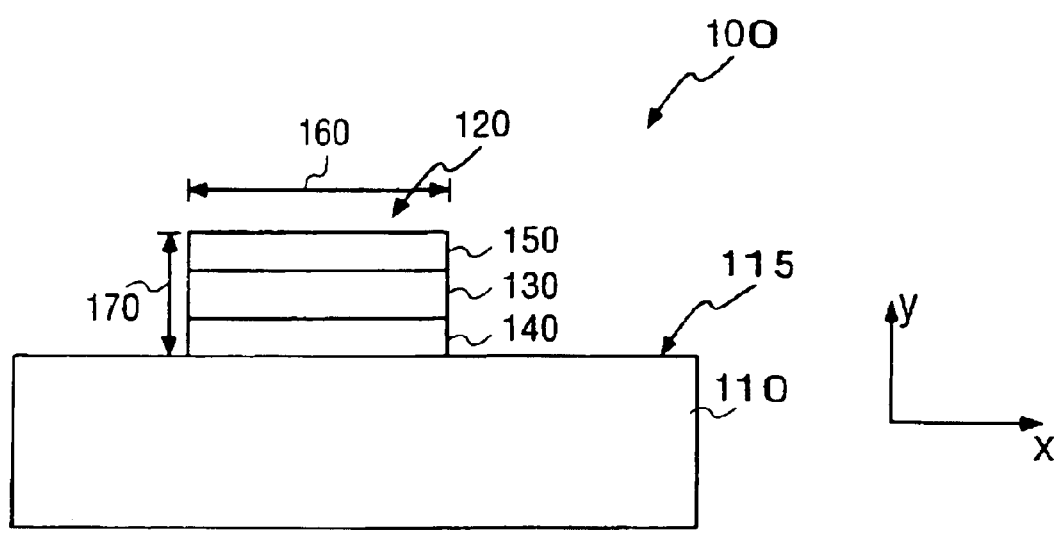
FIG. 1 shows a schematic cross-sectional view of a portion of an optical substrate structure having a waveguide formed thereon in accordance with an embodiment of the invention.

FIG. 1 illustrates a schematic cross-sectional view of a portion of an optical structure. Optical structure 100 includes substrate 110 that is, for example, a semiconductor substrate (including, as a portion, a silicon substrate), a polyimide substrate, a ceramic substrate, a multi-layer ceramic electric circuit substrate, and a thin film multi-layer circuit substrate. Substrate 10 may have a plurality of circuits formed thereon, including an OEIC and control circuit(s) as known in the art.

Formed on surface 115 of substrate 110 is waveguide 120 comprising thin film portions that make up core and cladding portions of the waveguide. In this embodiment, waveguide 120 includes core portion 130 having cladding portion 140 and cladding portion 150 disposed about core portion 130 and in material communication with core portion 130 in an xy plane.

In the embodiment described in FIG. 1, cladding portions 140 and 150 are, for example, silicon dioxide introduced on surface 115 and substrate 110 as thin films. Thin film cladding portion 140 may be introduced by thermal growth, a plasma enhanced chemical vapor deposition (PECVD) technique, or other techniques as known in the art. Cladding portion 140 may be suitably doped as known in the art to lower the index of refraction of the material.

Overlying cladding portion 140 is core portion 130. In one embodiment, a portion, including the entire portion, of core 130 is selected to include a material having a property such that an index of refraction changes by an order of at least a first decimal in response to a thermal modification (i.e., a "thermo-optic" material). Such materials include chalcogenide materials. A common chalcogenide used in memory application is an antimony (Sb)-tellerium (Te)-germanium (Ge) compositions ($Sb_xTe_yGe_z$) with the amount of tellerium equal to or less than about 70 percent (typically between 40 and 60 percent); the concentration of germanium between 15 and 50 percent; and the remainder antimony.

Chalcogenide materials are used in memory devices for their phase change property, i.e., a property that can be switched between a generally amorphous and a generally crystalline state by the application of thermal energy. The phase change can be exploited in controlling current flow. A further benefit is that such phase change is reversible.

In addition to undergoing a phase change (amorphous/crystalline) in the presence of sufficient thermal or heat energy, it is also observed that chalcogenide materials undergo a significant change in their index of refraction in changing, for example, from a generally amorphous to a generally crystalline state, i.e., in response to a temperature change. The change in index of refraction between an amorphous chalcogenide material and a crystalline chalcogenide material is on the order of 3 to 20 times. This is comparable to an index of refraction change to thermal energy exposure on the order of about a fifth decimal ($10^{-5}$) for silicon dioxide.

Referring to FIG. 1, in this embodiment core portion 130 comprises as a portion thereof, including the entire portion, a material having a property such that an index of refraction changes by an order of at least a first decimal in response to sufficient thermal energy (i.e., a thermo-optic material). Core portion 130 is introduced, in one example, to a thickness on the order of 6 to 8 microns thickness. Such thickness is comparable to a core size of state of the art optical fibers for use in OEICs. Such a film may be introduced by chemical vapor deposition. Where only a portion (e.g., a selected volume) of core portion 130 comprises a thermo-optic material, the remainder portion of waveguide 120 may include $SiO_2$ or other material as known in the art. Suitable patterning techniques (e.g., lithographic patterning) may be used to define a volume of thermo-optic material less than the entire portion of core portion 140. In one embodiment, the entirety of core portion 130 of waveguide 120 comprises a material or materials having an index of refraction greater than an index of refraction of each of cladding portion 140 and cladding portion 150.

Overlying core portion 130 is cladding portion 150 of, in one embodiment, $SiO_2$. Cladding portion 150 may be introduced as a thin film, such as by PECVD or other process as known in the art. In the example where cladding portion 150 is $SiO_2$, the material may be suitably doped as known in the art to lower the index of refraction of the material.

One technique of forming waveguide 120 is to introduce the material layers of core and cladding portions as blanket layers on surface 115 and substrate 110. Following the introduction of blanket films of core and cladding materials, traditional circuit patterning techniques, such as lithographic etch patterning may be used to define the dimensions of waveguide 120. In one embodiment, waveguide 120 has a width (denoted by reference number 160) approximately equal to at least twice its height (denoted by reference numeral 170).

It is appreciated that the structure (structure 100) shown in FIG. 1 may have a plurality of waveguides. For example, waveguides serving to introduce/transmit optical signals through optical fibers coupled to OEIC structure 100 may be assembled as a plurality of channels (e.g., 4, 8, or 16 channels) of light receiving/transmitting structures.

FIG. 2 and FIG. 3 show schematic top plan views of an optical structure such as optical structure 100. FIG. 2 and FIG. 3 also show a light source emitter such as, in this case, optical fiber 210 coupled to optical structure 100 to, for example, transmit or receive a light signal from/to an OEIC.

FIG. 2 shows waveguide 120 formed on substrate 110 having core portion 130. The entire portion of core 130 comprises a thermo-optic material (such material denoted by reference numeral 1300a). FIG. 3 shows a similar structure where the thermo-optic material portion of the core comprises less than the entire portion (denoted by reference numeral 1300b).

In each of FIG. 2 and FIG. 3, resistor element 200 is disposed on substrate 110 adjacent a portion of waveguide 120. Resistor element 200 is a conventional resistor element, such as a metal structure or a semiconductor material structure coupled to a current source through, for example, conductive traces in or on substrate 110. Resistor element 200 may be used to locally heat a portion of the core material (e.g., the thermo-optic portion) so as to change the index of refraction of the core material in a localized area. A representative temperature of a chalcogenide material such as $Te_xGe_ySb_z$ material is on the order of greater than 650° C. to crystallize the material.

As described above, a core material may be selected such that through an index of refraction change, a light transmission therethrough may be selectively favored. Accordingly, by controlling resistor element 200, an optical path on, for example, optical structure 100 may be selected and/or modified. FIG. 4 shows a representative example of a branched optical circuit. Optical circuit 300 includes primary path 310 coupled to branch path 320 and branch path 330. A light signal travelling through primary path 310 towards the branch can, in this example, assuming the index of refraction of branch path 320 and branch path 330 are equal, travel in either branch. FIG. 4 shows each branch path (branch path 320 and branch path 330) containing a core portion (core portions 340 and 350, respectively) comprising a material having a thermo-optic property (i.e., a property such that the index of refraction changes by an order of at least a first decimal in response to a thermal modification). Core portion 340 and core portion 350 are, for example, a chalcogenide material. It is generally known that light seeks to travel through a high index of refraction media. By modifying the index of refraction of one of core portion 340 and core portion 350, the index of refraction of such material portions may be modified. In one example, core portion 350 is modified through heating resistor element 360 to increase the index of refraction of core portion 340. In this manner, light travelling through primary path 310 will preferably choose branch path 320 as a circuit path. Alternatively, core portion 340 of branch path 320 may be held constant while the index of refraction core portion 350 in branch 330 is elevated through heat generated by resistor element 370. Thus, the thermal optic core materials having index of refractions that may be noticeably changed through the introduction of localized heat energy offers an effective switching scheme for selecting and modifying an optical circuit path.

FIG. 5 shows another example of the utility of a waveguide having a thermo-optic core portion. The example represents an application involving evanescent coupling. FIG. 5 shows a schematic top plan view of substrate 400 such as an OEIC circuit substrate. In this embodiment, substrate 400 includes waveguide 410 and waveguide 420. Over a portion of the waveguide lengths (portion 425), the waveguides are brought in close proximity (e.g., within a few microns). An optical signal such as signal 415 is transmitted through waveguide 410. In certain situations, it may be desirous to switch the signal transmission (signal transmission 415) from waveguide 410 to waveguide 420. This may be accomplished by having the signal "jump" from waveguide 410 to waveguide 420 (e.g., jump laterally from core portion-to-core portion). One way to encourage signal 415 to jump from waveguide 410 to waveguide 420 is by modifying the index of refraction within one of the waveguides. For example, waveguide 420 may be heated, such as by transmitting localized heat from resistor element 460, to raise the index of refraction of core portion 440 within waveguide 420. In such case, core portion 440 of waveguide 420 includes a thermo-optic material (i.e., having a material property such that the index of refraction changes by an order of at least a first decimal in response to a thermal modification). It is appreciated that an optical signal travelling initially in waveguide 420 may be caused to jump to waveguide 410 by modifying core portion 430 of waveguide 410 through localized heat energy from resistor element 450 in a similar manner. Thus, selecting a core portion having a thermo-optic property as described herein can facilitate evanescent coupling.

Figure 6:
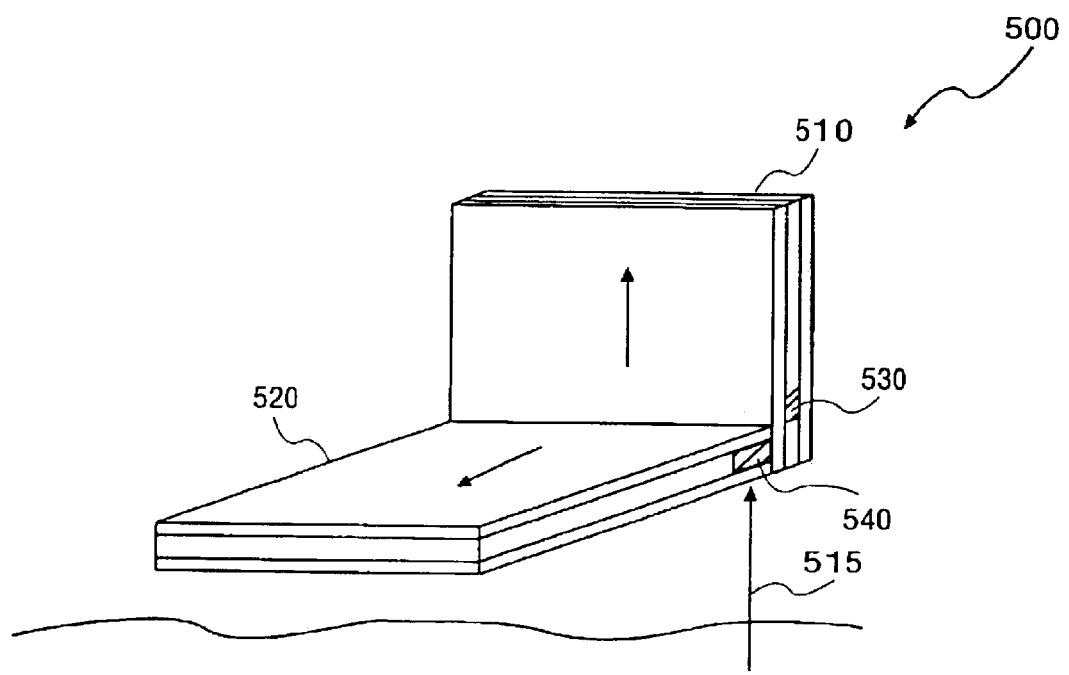
FIG. 6 schematically illustrates a top perspective view of a third embodiment of optical signal paths in accordance with an embodiment of the invention.

FIG. 6 shows still another example of the use of a modifiable thermal optic core portion material. FIG. 6 shows two waveguides on a substrate such as an OEIC circuit substrate. Referring to substrate 500, waveguides 510 and 520 are disposed generally orthogonally with respect to one another. The optical path taken by signal 515 (either to waveguide 520 or waveguide 510) may be determined by modifying the index of refraction of thermo-optic core portion 530 disposed, in this example, in waveguide 510. By increasing the index of refraction such as by the application of heat energy, light may be directed into waveguide 510. Alternatively, by increasing the index of refraction of thermo-optic core portion 540 of waveguide 520, signal 515 may be directed into waveguide 520.

The above examples are representative of the many uses of a thermally modifiable waveguide portion, such as a thermally modifiable core portion. It is to be appreciated that there are many applications of routing, switching, or diverting optical signals in circuit substrates as well as in higher order structures, such as chip-to-chip, board-to-board, and system-to-system optical signaling. Accordingly, although a circuit level optical switching, modifying, and routing has been illustrated in the above description, it is to be appreciated that such application may be used at other device levels.

In addition to thermo-optic materials such as chalcogenides, it is recognized that there are other materials that may be used in waveguides to modify the index of refraction within the waveguide or within an optical circuit of multiple waveguides. One such material is tantalum pentaoxide ($Ta_2O_5$). In another embodiment, a portion of a core of a waveguide, including the entire core, is tantalum pentaoxide ($Ta_2O_5$). Tantalum pentaoxide has an index of refraction on the order of 2.09. This compares to an index of refraction of undoped silicon dioxide on the order of 1.46. Because of its greater index of refraction, a core portion, such as core portion 130, of $Ta_2O_5$ yields an optical waveguide having a greater difference in the index of refraction between the core and cladding portion than traditional silicon dioxide waveguide. In this manner, the integrity of a light transmission signal is improved as is the total internal reflection within the waveguide is greater with the corresponding greater difference in index of refraction. The higher index of refraction of $Ta_2O_5$ allows lower insertion loss and smaller feature sizes. In the switching/routing applications described above in, for example, FIGS. 4–6, $Ta_2O_5$ may be substituted for the therm-optic core portions. Thus, waveguides may have a core portion of $SiO_2$ with portions of $Ta_2O_5$ at switch or routing points so that a signal is routed toward the $Ta_2O_5$ (the higher index of refraction).

In the preceding detailed description, the invention is described with reference to specific embodiments thereof. It will, however, be evident that various modification and changes may be made thereto without departing from the broader spirit and scope the invention as set forth in the claims. The specification and drawings are, accordingly, to be regarded in an illustrative rather than a restrictive sense.

What is claimed is:

1. An apparatus comprising:

a body having dimensions suitable for light transmission therethrough, the body comprising a core extending therethrough, a first portion of the core comprising a material having an index of refraction different than a second portion of the core and a cladding disposed about the core, wherein the material of the first portion of the core is thermally modifiable between an amorphous and a crystalline state.

2. The apparatus of claim 1, wherein the first portion of the core has a property such that the index of refraction changes by an order of at least a first decimal in response to a thermal modification.

3. The apparatus of claim 2, wherein the change of the index of refraction is reversible.

4. The apparatus of claim 2, wherein the first portion of the core comprises a chalcogenide.

5. The apparatus of claim 1, wherein the body is formed over a circuit substrate in thin film layers with the core layer disposed between cladding layers.

6. An apparatus comprising:

an optical electronic integrated circuit (OEIC) substrate comprising a plurality of waveguides, each waveguide comprising a core, a first portion of the core comprising a material having an index of refraction different than a second portion of the core, wherein the material of the first portion of the core is thermally modifiable between an amorphous and a crystalline state; and a light source emitter coupled to at least one of the plurality of waveguides.

7. The apparatus of claim 6, wherein the first portion of the core has a property such that an index of refraction changes by an order of at least a first decimal in response to a thermal modification.

8. The apparatus of claim 7, wherein the change of index of refraction is reversible.

9. The apparatus of claim 7, wherein the first portion of the core comprises a chalcogenide.

10. The apparatus of claim 7, wherein the plurality of waveguides are arranged in a circuit of different paths, an optical path dictated by a modification of the index of refraction of the portion of the core at least one of the plurality of waveguides.

11. The apparatus of claim 10, further comprising a plurality of resistors respective ones disposed adjacent respective ones of the plurality of waveguides, wherein the state of a resistor modifies the index of refraction of the portion of the core of a waveguide.

* * * * *

UNITED STATES PATENT AND TRADEMARK OFFICE
CERTIFICATE OF CORRECTION

PATENT NO. : 6,778,727 B2
DATED : August 17, 2004
INVENTOR(S) : Ramalingam et al.

It is certified that error appears in the above-identified patent and that said Letters Patent is hereby corrected as shown below:

Column 2,
Line 31, delete "10" and insert -- 110 --.

Column 3,
Lines 11-12, delete "$10^{315}$" and insert -- $10^{-5}$ --.

Column 5,
Line 56, delete "therm-optic" and insert -- thermo-optic --.

Signed and Sealed this

Twenty-first Day of December, 2004

JON W. DUDAS
*Director of the United States Patent and Trademark Office*